United States Patent
Somaraju

(10) Patent No.: US 10,484,194 B2
(45) Date of Patent: Nov. 19, 2019

(54) CONTROLLING A PLURALITY OF NETWORKED BUILDING TECHNOLOGY DEVICES

(71) Applicant: TRIDONIC GMBH & CO KG, Dornbirn (AT)

(72) Inventor: Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/738,343

(22) PCT Filed: Jun. 28, 2016

(86) PCT No.: PCT/AT2016/060002
§ 371 (c)(1),
(2) Date: Dec. 20, 2017

(87) PCT Pub. No.: WO2017/008096
PCT Pub. Date: Jan. 19, 2017

(65) Prior Publication Data
US 2018/0176029 A1 Jun. 21, 2018

(30) Foreign Application Priority Data
Jul. 16, 2015 (EP) .................................... 15177063

(51) Int. Cl.
*H04L 12/18* (2006.01)
*H04L 12/403* (2006.01)
(Continued)

(52) U.S. Cl.
CPC .......... *H04L 12/1895* (2013.01); *H04L 12/18* (2013.01); *H04L 12/403* (2013.01); *H04L 12/42* (2013.01); *H05B 37/0245* (2013.01)

(58) Field of Classification Search
None
See application file for complete search history.

(56) References Cited

U.S. PATENT DOCUMENTS 8,429,642 B1 4/2013 Cheng et al.
9,974,146 B2 * 5/2018 Daranyi ............. H05B 37/0272
(Continued)

OTHER PUBLICATIONS

European search report in priority European Application 15177063.3 dated Jan. 13, 2016.
(Continued)

*Primary Examiner* — Michael J Moore, Jr.
(74) *Attorney, Agent, or Firm* — Andrus Intellectual Property Law

(57) ABSTRACT

A system for controlling a plurality of building technology devices, in particular lighting units, by sending messages over a network, is provided, the system comprising: a plurality of building technology devices, and a network functionally connecting said building technology devices, wherein at least one of the building technology devices is a message issuing building technology device configured to send multicast or broadcast messages to a plurality of or all of the remaining building technology devices. The network is arranged such that at least three, preferably each of the remaining building technology devices form at least one ring network topology, and wherein the remaining building technology devices in such ring network topology are configured to exchange unicast messages in this at least one ring network topology.

10 Claims, 2 Drawing Sheets

(51) Int. Cl.
*H04L 12/42* (2006.01)
*H05B 37/02* (2006.01)

(56) References Cited

U.S. PATENT DOCUMENTS

| | | | |
|---|---|---|---|
| 10,366,048 B2* | 7/2019 | Wang | H04L 12/2809 |
| 2003/0102979 A1* | 6/2003 | Jednacz | H04L 45/00 |
| | | | 340/9.1 |
| 2008/0037571 A1 | 2/2008 | Hetzel et al. | |
| 2009/0267540 A1* | 10/2009 | Chemel | H05B 37/0218 |
| | | | 315/297 |
| 2009/0274158 A1 | 11/2009 | Sharp et al. | |
| 2010/0262296 A1 | 10/2010 | Davis et al. | |
| 2010/0277079 A1* | 11/2010 | Van Der Veen | H05B 37/0254 |
| | | | 315/152 |
| 2014/0028200 A1* | 1/2014 | Van Wagoner | H05B 37/0272 |
| | | | 315/158 |
| 2014/0098713 A1 | 4/2014 | Beckhardt et al. | |
| 2014/0293276 A1 | 10/2014 | Hughes et al. | |
| 2015/0042240 A1* | 2/2015 | Aggarwal | H04W 4/70 |
| | | | 315/292 |
| 2015/0124807 A1 | 5/2015 | Martin et al. | |
| 2015/0173160 A1* | 6/2015 | Shira | H05B 37/0245 |
| | | | 315/130 |
| 2015/0296599 A1* | 10/2015 | Recker | H05B 37/0272 |
| | | | 315/153 |
| 2016/0095191 A1* | 3/2016 | Vangeel | G06F 8/654 |
| | | | 315/294 |
| 2016/0100474 A1* | 4/2016 | Reh | H05B 37/0272 |
| | | | 315/320 |
| 2016/0183351 A1* | 6/2016 | Snyder | H04L 12/10 |
| | | | 315/152 |

OTHER PUBLICATIONS

PCT search report in parent PCT Application PCT/AT2016/060002 dated Oct. 5, 2016.
Office action issued by the European Patent Office in priority European Application 15177063.3 dated Jul. 26, 2017.
Office action issued by the European Patent Office in foreign priority European Application 15177063.3 dated Jun. 5, 2018.

* cited by examiner

CONTROLLING A PLURALITY OF NETWORKED BUILDING TECHNOLOGY DEVICES

CROSS REFERENCE TO RELATED APPLICATIONS

The present application is the U.S. national stage application of International Application PCT/AT2016/060002, filed Jun. 28, 2016, which international application was published on Jan. 19, 2017 as International Publication WO 2017/008096 A1. The International Application claims priority to European Patent Application 15177063.3, filed Jul. 16, 2015.

FIELD OF THE INVENTION

The invention relates to a system for controlling a plurality of networked building technology devices, such as operating devices for lighting means, and in particular lighting units such as luminaires. It especially deals with building technology devices arranged in a network in which the building technology devices can communicate by broadcast, multicast and/or unicast messages over a communication network connecting building technology devices.

Messages are sent and received over the network and used for communication between the building technology devices (wireless or wire-bound) and especially between an issuing building technology device (also referred to as sender) configured to send multicast or broadcast messages to a plurality or all of the remaining, i.e. non-issuing, building technology devices.

BACKGROUND OF THE INVENTION

It is known that for communication between connected network devices, unicast messages (or point-to-point messages) or unicast communication can be used. Unicast messages allow to individually address a single device in the network by a sender. If the addressed device receives a message, it typically sends back to the sender an acknowledgement message (ACK). In case the acknowledgement is received, the sender knows that the sent message was well received. Also, a non-acknowledgement message (NACK) can be sent by the receiver, in case the message was not well-received, e.g. could not be decoded or was only partially received. In case of an non-acknowledgement message or in case the acknowledgement message is not received by the sender or is not received in a specified time period, the sender knows or expects that something went wrong and may re-send the message. This way of communication provides a highly reliable network communication as the procedure ensures that all messages or network (IP, internet protocol) packages are received by a receiver.

However, addressing a high number of devices using unicast messages by the sender leads to sending messages in a consecutive or sequential manner and hence, from the point in time the sender sends the message to a first addressed device, to the time the last addressed device receives the message a lot of time passes.

Therefore, for example, if the devices are lighting units such as luminaires, using unicast communication leads to latencies which means that not all building technology devices receive a message at the same time. If the building technology devices are, e.g., activated by the message sent from the sender, not all building technology devices are switched on simultaneously, or at the same time, but will, depending on the addressing scheme, may be activated randomly or in a sequence depending on their assigned addresses.

Sending messages to all or a group of building technology devices and waiting for individual acknowledgements suffers from two problems: Firstly the different end points receive the messages at different points in time and this affects synchronization of the building technology devices. Secondly the latency of message reception increases as the number of building technology devices addressed increases. This results in poor system performance.

Thus, a control of all or a group of building technology devices is needed such as point-to-multipoint communication of or a multipoint-to-multipoint communication. The message issuing building technology device can be a single sender, master, control unit, etc. Such communication is often achieved by either broadcasting messages to all devices connected to the sender by e.g. a single wired bus, or by flooding a wireless network. Examples of such techniques include DALI group communication, IPv6 multicast, IPv4 broadcast. Each building technology has an address which identifies the building technology device. An additional multicast or broadcast address can be defined to address a portion or all devices of a network (cf. common networking approaches using IPv4 and/or IPv6).

However, multicast, broadcast and unicast methods have limitations when applied to the problem of group communication in building technology systems. With multicast or broadcast methods, the initial message is sent from a building technology device issuing a message to multiple building technology devices at the same time, which are received by the destination devices at approximately the same time. Due to the nature of multicast or broadcast message sending, the do not acknowledge the receipt of the message by replying to the issuing building technology device.

If the message is sent via an unreliable communication medium such as an IPv6 over wireless network, it cannot be guaranteed that all destination devices receive the transmitted message. Therefore, multicast or broadcast messages only provide an unreliable means of communication. Even though multicast or broadcast messages allow addressing a number of building technology devices at the same time, there are typically no acknowledgement messages sent back to the sender from the devices addressed by the broadcast or multicast message to avoid congestion in the network. Hence, the sender has no way of determining whether or not the addressed devices received the sent broadcast or multicast message.

SUMMARY OF THE INVENTION

The invention hence aims at providing an alternative approach for addressing building technology devices in a network and therefore provides a system and a method described herein.

In a first aspect a system for controlling a plurality of building technology devices, in particular lighting units, by sending messages over a network, is provided, the system comprising: a plurality of building technology devices, and a network functionally connecting said building technology devices, wherein at least one of the building technology devices is a message issuing building technology device configured to send multicast or broadcast messages to a plurality of or all of the remaining building technology devices. The network is arranged such that at least three, preferably each of the remaining building technology devices form at least one ring network topology, and wherein the remaining building technology devices in such ring network topology are configured to exchange unicast messages in this at least one ring network topology.

The message issuing building technology device can send the multicast or broadcast messages to at least one multicast or broadcast address. The broadcast or multicast address may identify a number of or all remaining building technology devices.

At least one building technology device can be a luminary.

The message issuing building technology device can be a control unit, preferably a switch or input device.

The message issuing building technology device may be part of at least one ring network topology.

A remaining message issuing building technology device can send unicast messages to at least one other building technology device.

A remaining building technology device may forward a received unicast message to at least one neighbor building technology device in the at least one ring network topology.

A building technology device can verify whether at least one neighbor building technology device in the at least one ring network topology did receive a new message.

The multicast, broadcast and/or unicast messages can comprise a sequence number. This sequence number can identify the age of the message.

A building technology device in the at least one ring network topology can exchange a received multicast, broadcast and/or unicast message with at least one neighbor building technology device in the at least one ring network topology by issuing the unicast message.

A building technology device may store and/or evaluate the unicast message, if the age of the unicast message is different from, in particular younger than, that of a unicast, broadcast or multicast message stored at the building technology device. A message is e.g. younger when its sequence number is higher or lower, depending on the counting scheme, as the stored message. Also the building technology device may have information on what should be regarded as a newer message.

The building technology device is configured to update its state based on the received unicast, multicast or broadcast message.

The unicast message can be exchanged between the building technology devices in the at least one ring network topology until all building technology devices in the at least one ring topology received the issued message, preferably the message with the highest sequence number.

The multicast message can be an IPv6 multicast message.

In another aspect, a method for controlling a plurality of building technology devices, in particular lighting units, by sending messages over a network is provided, wherein at least one of a plurality of building technology devices in a network functionally connecting said building technology devices is a message issuing building technology device sending multicast or broadcast messages to a plurality of or all of the remaining building technology devices. The network is arranged such that at least three, preferably each of the remaining building technology devices form at least one ring network topology, and wherein the remaining building technology devices in such ring network topology exchange unicast messages in this at least one ring network topology.

The invention is now also described with reference to the figures.

DETAILED DESCRIPTION

Figure 1:
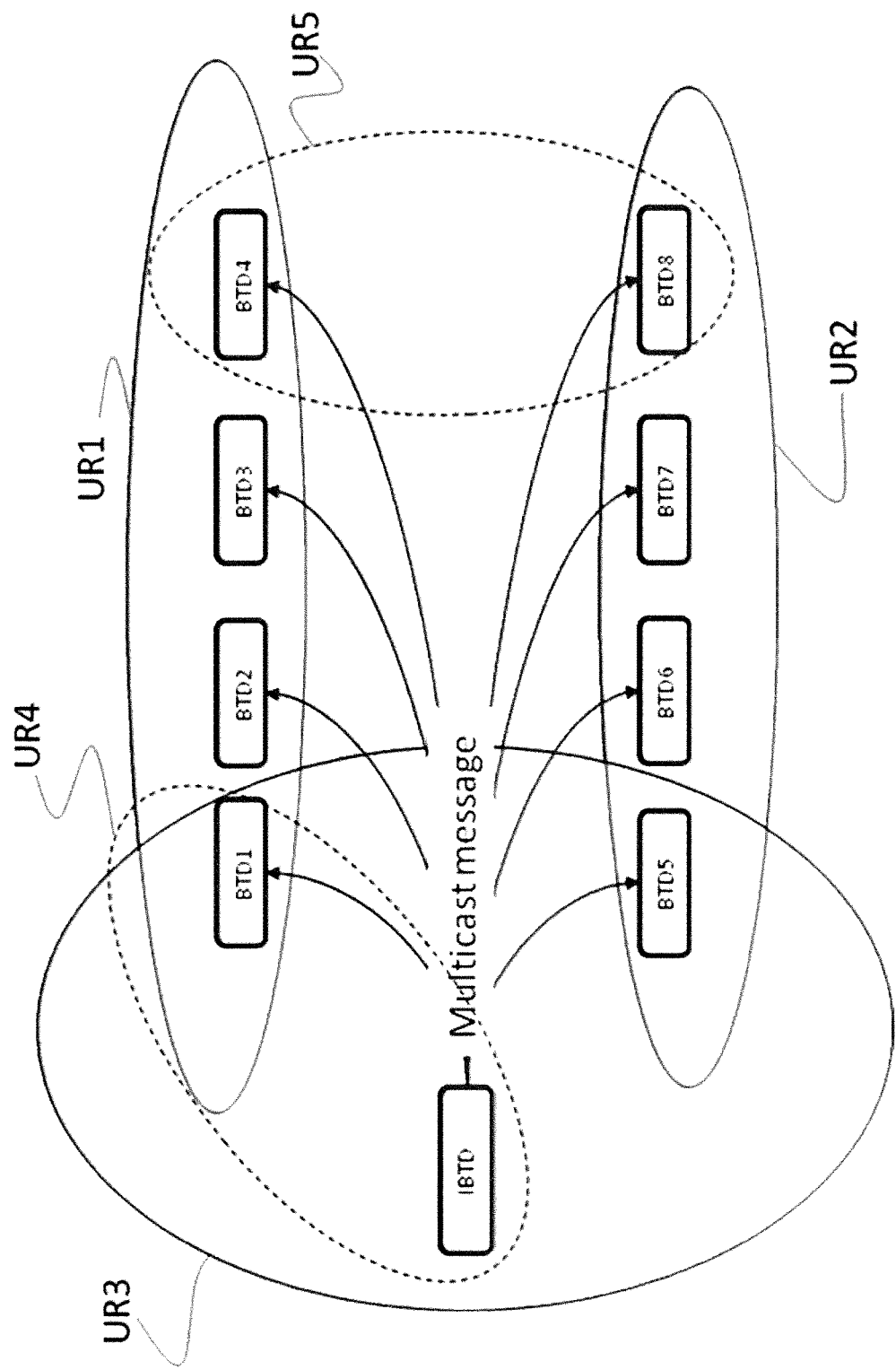
FIG. 1 shows a schematic overview of the invention.

The invention allows increasing communication reliability in networks using multicast or broadcast communication. This is achieved through a combination of multicast or broadcast based communication, which allows achieving the low latency, with the reliability of unicast communication.

In particular, the possibility to address a plurality of building technology devices is combined with a reliable backup communication to ensure that all devices receive the message sent by a building technology device issuing the message.

Therefore, preferably all devices of the network are also member of at least one ring network typology, which means, that preferably each building technology device is logically connected in at least one ring communication structure (e.g. as a logical overlay to the physical network), in which it passes unicast messages, in particular to two neighbors in the ring network topology.

For example, a building technology device issuing a message, for e.g. a control unit or an input device, sends a multicast or broadcast message to a plurality or all other remaining building technology devices on the network. The broadcast or multicast messages are signaled to all or a portion of the building technology devices of the network. The remaining building technology devices, i.e. the building technology devices not issuing the message, would then normally receive the message and would change their state or parameters according to the information contained in the received message.

In case the building technology devices are luminaires, the luminaires will, e.g., activate their lighting means (i.e. are switched on) or deactivate their lighting means (are switched off). It has to be understood that also other operations can be performed by luminaires based on an issued message, e.g. the luminaires can be dimmed, a color point could be adjusted, the color for the emitted light could be defined or the luminaire can be controlled according to scene information.

However, in case the building technology devices are other types of devices (e.g. air conditioning devices, actors, sensors, . . . ) respective messages can be sent to the devices to control the behavior. It is also possible that a multicast group is defined for each different type of building technology device linked in the network. For example, a multicast address can be set for all luminaires, while another multicast network can be set for all sensors in the network. It is also possible, that a specific identifier or address is set in at least some building technology devices to group building technology devices, which then react to a message issued by the sender comprising this group identifier.

However, as mentioned above, there are no acknowledgement messages transmitted back to the building technology device issuing the multicast message. Therefore, a second means of communication, such as a local unicast communication, is used following the multicast communication. As stated above, each building technology device is member of at least one ring network topology and thus has at least one or two predefined neighbor building technology devices in this ring network typology. Also the network technology device issuing the message can be member of such a ring network typology. Using unicast messages, and thus reliable communication, the building technology devices of a ring network topology verify whether their neighbors or at least one neighbor actually received a new message.

In particular, a building technology device may query at least one of its neighbors to find out which message was last received at the neighbor. Each message sent can include a sequence number, which is used to identify the age of a message. For example, the sequence number can be increased by the sender whenever a message is issued. Based on this sequence number a building technology device can check whether its neighbors has received a message with a newer (e.g. higher) sequence number or still has an older message (with a lower sequence number). If a message with a higher sequence number found, the querying building technology device can request the message from its neighbor having the newer message with the higher sequence number. The queried device then transmits the message and a simple exchange of the newest message is performed. The querying of neighbor devices can for example be performed in specific time intervals.

Alternatively or additionally, each building technology device can send a received broadcast, multicast or unicast message to its neighbor devices in the ring network topology, preferably whenever a message is received, that is newer than the message stored at the respective device.

In result, the new message is propagated to all building technology devices and a synchronization of the building technology devices is performed. For example, in case a building technology device receives a newer message, it automatically sends a newer message to its neighbors or at least one neighbor using unicast messages. Using unicast messages and thus reliable communication, the message issuing or sending building technology device can determine whether its neighbor nodes received the message by the acknowledgement messages and re-transmission can be performed. Also, if a neighbor in the ring network topology does not respond for a predefined time or a predefined number of transmissions or re-transmissions of messages, the building technology device can inform a central unit or the issuing building technology device, as the neighbor device might be defect or a connection to the neighbor device is faulty.

Thus, using the unicast messages in the network ring topology, a reliable communication between the neighboring building technology devices is achieved. In particular, at least one building technology device of each ring is part of the building technology devices addressed by the multicast message. However it is also possible, in order to increase the reliability, that at least one building technology device is part of two ring network typologies. Also, the sender can be part of at least one ring network typology.

FIG. 1 shows the principle of the invention. A message issuing building technology device IBTD issues a multicast message to the remaining building technology devices BTD1-BTD8. The network through which the multicast message is conveyed can be a wired network, e.g. an Ethernet based network, a DALI or DSI bus.

Building technology devices BTD1-BTD4 are also connected in a first unicast ring network topology UR1, while building technology devices BTD5-BTD8 are connected in a second unicast ring network topology UR2. The ring network topology can be a logical one, i.e. the ring can be defined logically in the network connecting the devices and which is used for transmission of the multicast message. The ring network topology can also be realized by using a separate network for connecting the respective devices in a ring structure. In this case, the building technology devices can be equipped with an additional communication interface to connect to the second network. The building technology devices, of course have, a communication interface to communicate on the network used for the multicast transmission.

In a third unicast ring network topology UR3 the message issuing device IBTD is connected in a third ring network topology UR3 with a building technology device of the first and the second unicast ring network topology UR1, UR2.

Alternatively or additionally to the third unicast ring network topology UR3 also a fourth unicast ring network topology UR4 and a fifth unicast ring network topology UR5 (both illustrated in dashed lines in FIG. 1) can be used to connect the message issuing device IBTD indirectly with all other remaining building technology devices BTD1-BTD8. Hence, remaining building technology devices BTD4 and BTD8 are member of two ring network topologies. Building technology device BTD4 is member of the first unicast ring network topology UR1 and the fifth unicast ring network topology UR5. Building technology device BTD8 is member of the second unicast ring network topology UR2 and the fifth unicast ring network topology UR5. The message issuing device IBTD is member of the fourth unicast ring network topology UR4 and building technology device BTD1 is member of the first unicast ring network topology UR1 and the fourth unicast ring network topology UR4.

Of course, also if the underlying network is a wireless network, the communication interfaces of building technology devices BTD1-BTD8 and the message issuing building technology device IBTD are configured to both receive and send on the wireless network.

Figure 2:
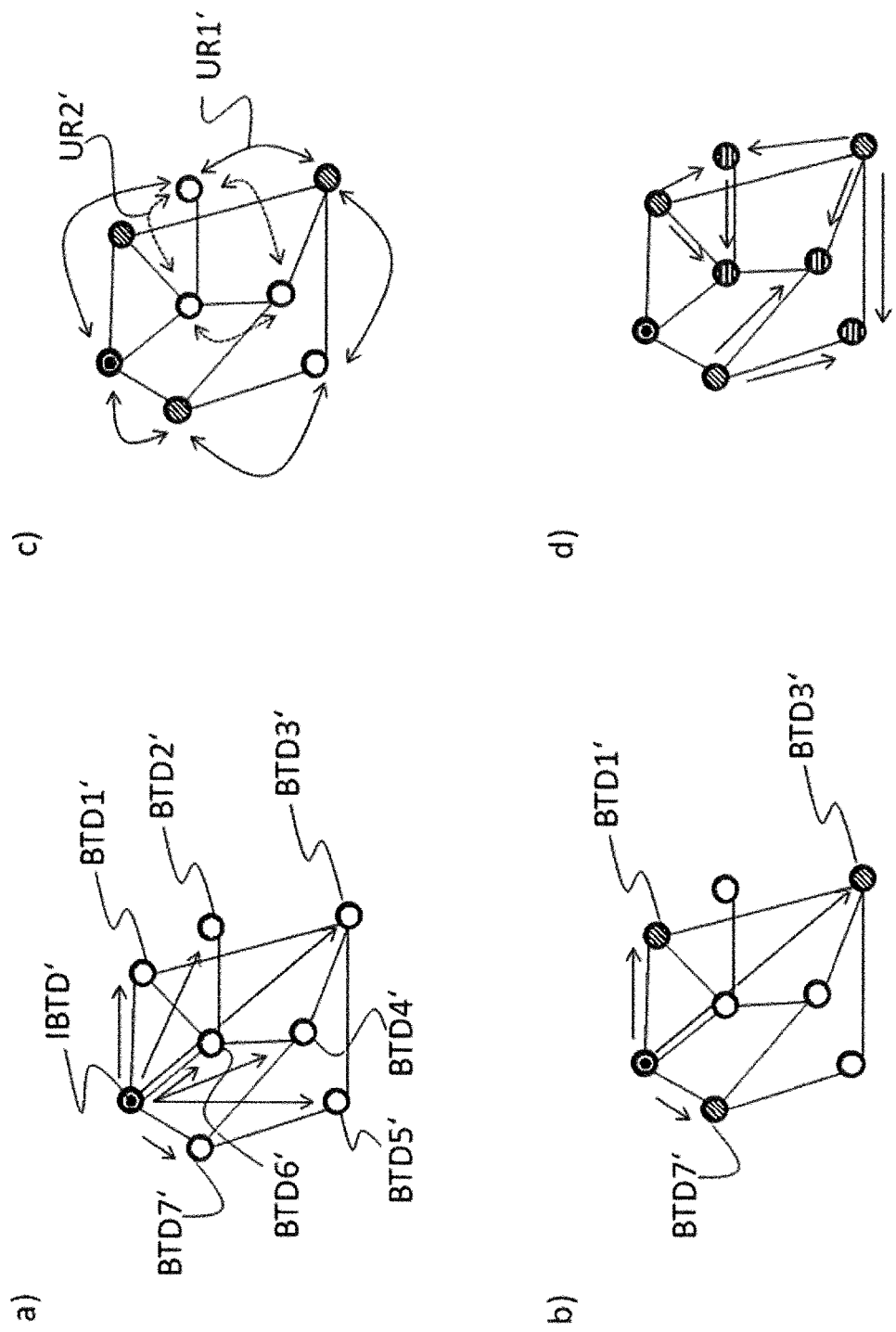
FIGS. 2a)-2d) shows an example of how messages can be transported.

FIG. 2 schematically shows how messages can be passed in an example. FIG. 2a) illustrates a network structure (solid lines) with a message issuing building technology device IBTD' and building technology devices BTD1'-BTD7'. The arrows indicate how a multicast message is normally transmitted in the network. The multicast or broadcast message is send by the message issuing building technology device IBTD' to and is received by all devices BTD1'-BTD7'.

FIG. 2b) shows the network and devices of FIG. 2a). However, only building technology devices BTD1', BTD3', and BTD7' receive the message in this example. FIG. 2c) shows that all building technology devices BTD1'-BTD7' (the reference signs are not repeated) with the exception of building technology devices BTD1', BTD2', and BTD6' are connected in a first ring network topology UR1' (solid double arrow), while building technology devices BTD1', BTD2', and BTD6' are part of a second ring network topology UR2' (dotted double arrow).

After receiving the broadcast or multicast message, as shown in FIG. 2d), the building technology devices BTD1', BTD3', and BTD7' send or forward the message to building technology devices BTD2', BTD4', BTD5' and BTD6', using unicast messages in the first and second ring network topology UR1', UR2'. This can either be performed automatically, or upon a request received by building technology devices BTD2', BTD4', BTD5' and/or BTD6'.

The invention claimed is:

1. A system for controlling a plurality of networked building technology devices (IBTD, BTD1-BTD8), comprising lighting units, by sending messages over a network, the system comprising:
   a plurality of building technology devices (IBTD, BTD1-BTD8), wherein at least one building technology device (IBTD, BTD1-BTD8) is a lighting unit, and
   a network functionally connecting said building technology devices (IBTD, BTD1-BTD8),
   wherein at least one of the building technology devices (IBTD, BTD1-BTD8) is a message issuing device (IBTD) configured to send multicast or broadcast messages to a plurality of or all of the remaining building technology devices (BTD1-BTD8), wherein any multicast or broadcast message is an IPv4 or IPv6 message, and the remaining building technology devices are configured to change state or not depending on information contained in a received message, wherein the network is arranged such that at least three of the remaining building technology devices (BTD1-BTD8) are included in first ring network topology and at least three of the remaining building technology devices are included in a second ring network topology (UR1-UR3), and wherein the at least three remaining building technology devices in such ring network topologies (UR1-UR3) are configured to exchange unicast messages with neighboring devices in the respective ring network topology (UR1-UR3) and wherein said unicast messages are individually addressed to the respective neighboring device when sent and the respective neighboring device sends an acknowledgment to the sending device when the message is properly received; and further wherein the multicast, broadcast and unicast messages comprise a sequence number and the sequence number is increased or decreased by the message issuing device whenever a message is issued so that the sequence number can identify the age of the message depending on a counting scheme;

the remaining building technology devices (BTD1-BTD8) are configured to evaluate a received unicast message on the condition that the age of the unicast message is younger than that of any previous message received the building technology device (IBTD, BTD1-BTD8); and the remaining building technology devices (BTD1-BTD8) are configured to verify whether at least one neighbor device has received a new message using unicast messages.

2. The system according to claim 1, wherein the message issuing building technology device (IBTD) sends the multicast or broadcast messages to at least one multicast or broadcast address.

3. The system according to claim 1, wherein the message issuing building technology device (IBTD) is a control unit, comprising a switch or input device.

4. The system according to claim 1, wherein the message issuing building technology device (IBTD) is part of at least one ring network topology (UR1').

5. The system according to claim 1, wherein the message issuing building technology device (IBTD) is configured to send unicast messages to at least one other building technology device (BTD1, BTD5).

6. The system according to claim 1, wherein a building technology device (BTD1-BTD8) is configured to forward a received unicast message to at least one neighbor building technology device in the respective ring network topology (UR1-UR3).

7. The system according to claim 1, wherein the unicast message is exchanged between the building technology devices (IBTD, BTD1-BTD8) in the at least one ring network topology (UR1-UR3) until all building technology devices (IBTD, BTD1-BTD8) in the respective ring network topology (UR1-UR3) received the issued message.

8. The system according to claim 1, wherein any multicast or broadcast message is an IPv6 multicast message.

9. A method for controlling a plurality of building technology devices (IBTD, BTD1-BTD8) comprising lighting units, by sending messages over a network, said method comprising the steps of:

providing a plurality of building technology devices (IBTD, BTD1-BTD8) in a network to functionally connect said building technology devices;

arranging the network such that at least three of the remaining building technology devices (BTD1-BTD8) are included in a first ring network topology (UR1-UR3), and the remaining building technology devices (BTD1-BTD8) in the first ring network topology (UR1-UR3) exchange unicast messages in the first ring network topology (UR1-UR3) and at least three of the remaining building technology devices (BTD1-BTD8) are included in a second ring network topology (UR1-UR3), and the remaining building technology devices (BTD1-BTD8) in the second ring network topology (UR1-UR3) exchange unicast messages in the second ring network topology (UR1-UR3);

sending IPv6 or IPv4 multicast or broadcast messages from a message issuing building technology device (IBTD) to a plurality of or all of the remaining building technology devices (BTD1-BTD8) wherein the issued messages contain a sequence number that is increased or decreased by the message issuing device whenever a message is issued so that the sequence number can identify the age of the message depending on a counting scheme;

upon receiving the issued message at a respective building technology device by multicast or broadcast, sending the issued message via unicast messaging to at least one neighbor in the respective ring network topology;

evaluating in the recipient building technology device (BTD1-BTD8) receiving the issued message by unicast messaging whether the received message is younger than that of any message previously received at the recipient building technology device (BTD1-BTD8); and when a new message is received via multicast or broadcast, or by unicast, by the recipient building technology device, changing the state of the recipient building technology device or not depending on information contained in a received message;

verifying whether at least one neighbor device has received the new message using unicast messaging and comparing the sequence number in the new message to the most recent message stored on the neighbor device.

10. The system according to claim 1 wherein based on this sequence number a building technology device checks whether its neighbor has received a message with a higher sequence number or still has an older message with a lower sequence number, wherein, if a message with a higher sequence number is found, the querying building technology device requests the message from its neighbor having the newer message with the higher sequence number, wherein the queried device then transmits the message to the querying building technology device.

* * * * *